T. WIARD.
Cultivator.
No. 3,356.
Patented Nov. 24, 1843.
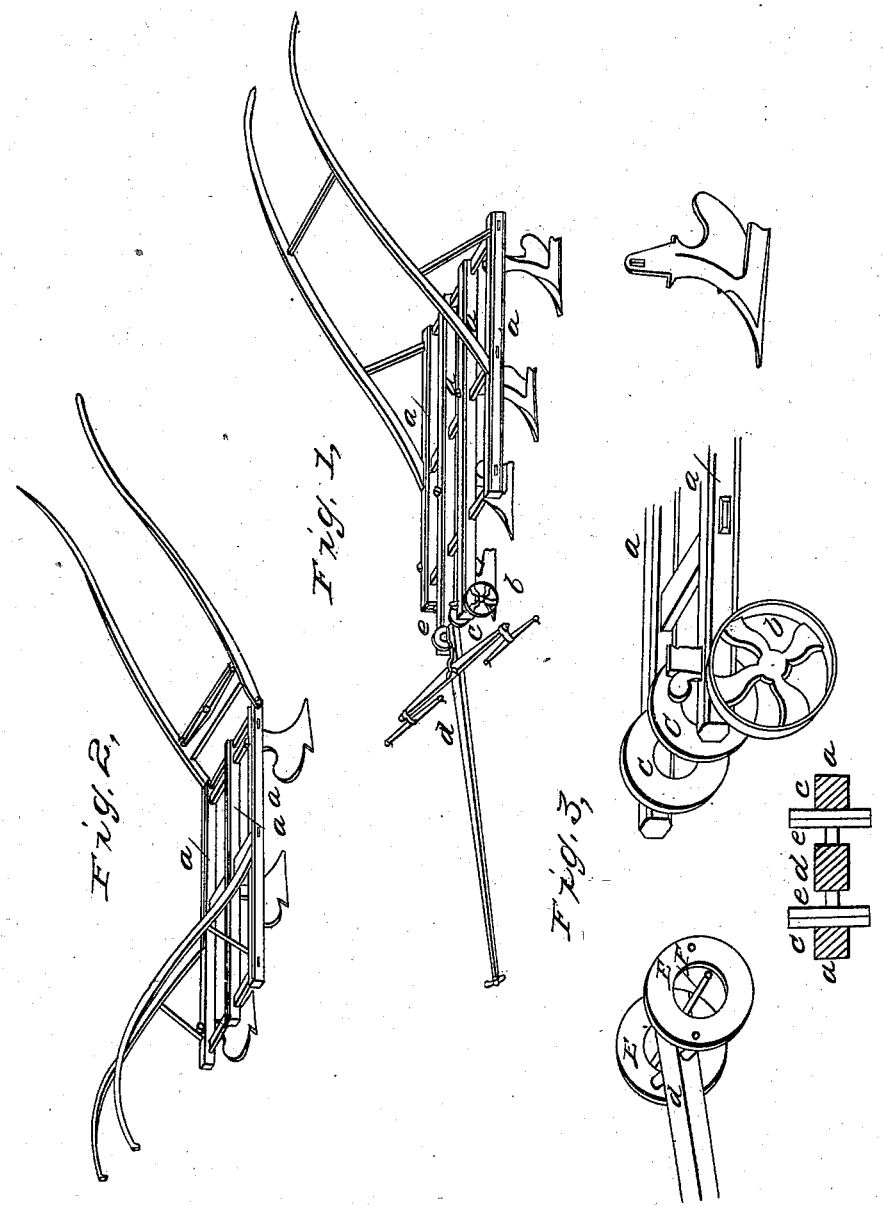

UNITED STATES PATENT OFFICE.

THOMAS WIARD, OF EAST AVON, NEW YORK.

IMPROVEMENT IN GANGS OF PLOWS.

Specification forming part of Letters Patent No. 3,356, dated November 24, 1843.

*To all whom it may concern:*

Be it known that I, THOMAS WIARD, of East Avon, in the county of Livingston and State of New York, have invented a new and useful Improvement in Plows when a combination of plows are used; and I do hereby declare that the following is a full, clear, and correct description thereof, reference being had to the accompanying drawings, which form a part of this specification, in which—

Figure 1 is a perspective of the plow; Fig. 2, a single-horse plow; Fig. 3, detached parts.

The nature of my invention consists in attaching to a gang of plows a pole or shaft so as to allow the plows freedom of action, and at the same time keep a straight furrow.

I construct this plow in the following manner: A frame of parallel beams, a, is formed for four (more or less) plows, one beam for each plow, in such manner as to allow them to be set closer or wider. The beams are connected by cross-braces. Two handles are affixed to them in a similar manner to those now in common use. The beams are mortised in a line diagonal to the parallelogram formed by them—that is, the left-hand plow being near the heel of the beam and the rest farther forward, and so on to the last or right-hand plow, which is nearest the front end. The plows are similar to those patented by me in April, 1842, the standards having a shoulder on both edges, which rests against the under side of the beam. The tongue that passes through the beam is keyed on the upper side. A brace may be added to the plows, extending up from the landside to the beam, if required. These plows should be pitched more than the single plow. The depth to which they are to run should be governed by a wheel, b, attached to one of the beams. This wheel is made adjustable, so as to set the plow deeper or shallower, as required. On the inside of the forward end of each of the two inner beams of the two-horse plow a ring of iron, c, is fastened by bolts to the beams vertically, and on each side of the pole d are secured similar plates or rings, E, the faces of which rub against the faces of rings C. A stout bolt, F, passes through the ends of the beam and the pole exactly in the center of these rings, on which the pole turns. The other end of the pole, by this contrivance, can rise and fall independent of the beams, while its lateral motion is entirely arrested without the beams being turned with it. Instead of the vertical rings above described on each side of the pole, blocks of wood may be used, or any other substance that will allow the pole to rise and fall independent of the frame and prevent any lateral motion.

If shafts are used instead of a pole, (see Fig. 2,) joints are made with them, the object being to give them a free action up and down, while they steady the beams and prevent their turning sidewise, so as to make a crooked furrow.

The operation of a gang of plows constructed in this way is to follow all the uneven ground and draw a straight furrow. If either of these plows to the right or left of the line of draft strike any obstacle, the others are prevented from swinging round by the pole, (as is the case with those that are used without a pole,) and they at the same time plow the ground all of an equal depth, following the uneven surface of the ground, on which the wheel bears and by which the depth is regulated, the joint in the pole allowing a freedom of action in that direction. In those plows where the pole or shafts are firmly fixed when the plows descend into a hollow they are lifted out of the ground, and when they come upon a rising ground they cut too deep, even where a wheel is used.

The construction of the frame may be varied to suit the convenience of the manufacturer.

Having thus perfectly described the construction and operation of my plows, what I I claim therein as my invention, and desire to to secure by Letters Patent, is—

The combination of a pole or shafts with a frame and gang of plows, in the manner described, in such a way as that they will have an up-and-down motion, while all lateral motion is prevented in the pole or shafts independent of the plows.

THOS. WIARD.

Witnesses:
ALVIN SAVAGE,
J. J. GREENOUGH.